UNITED STATES PATENT OFFICE.

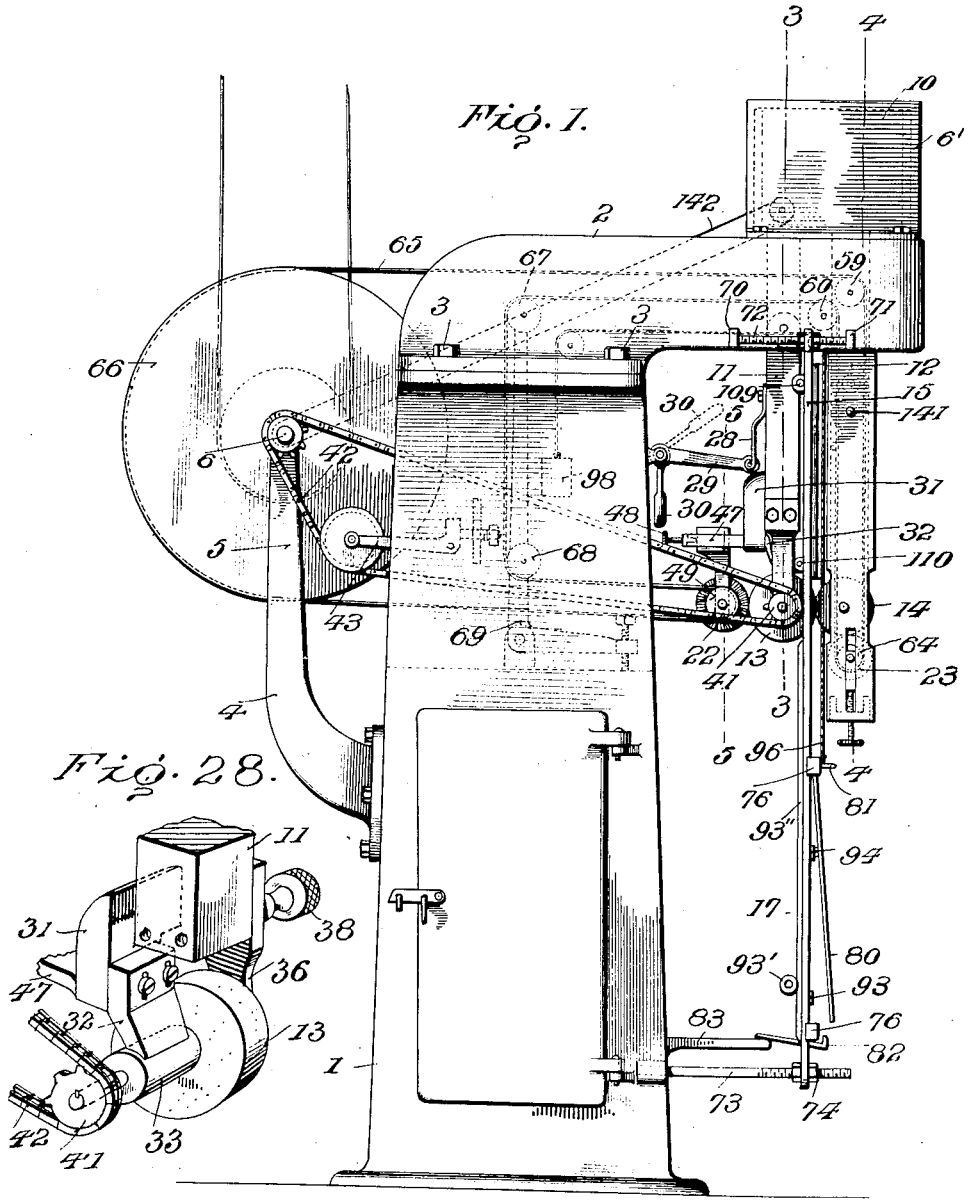

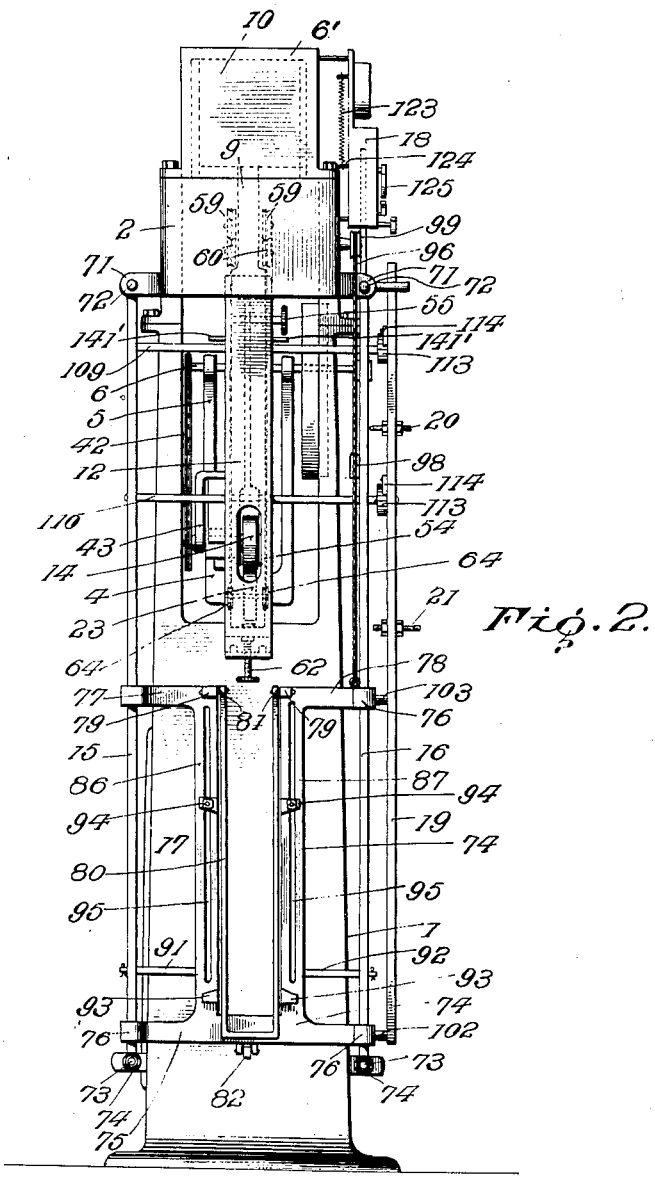

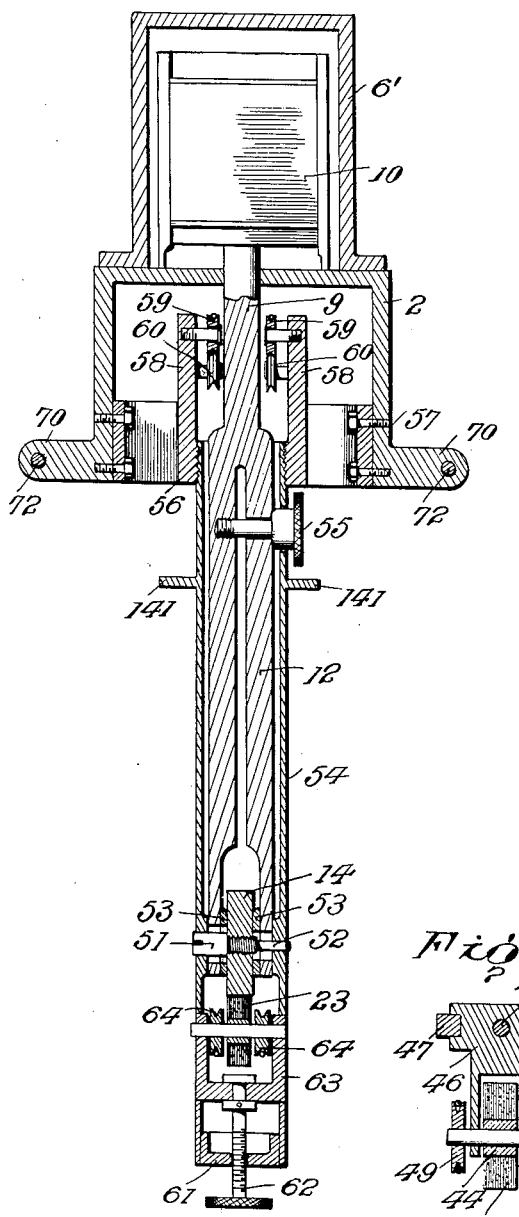
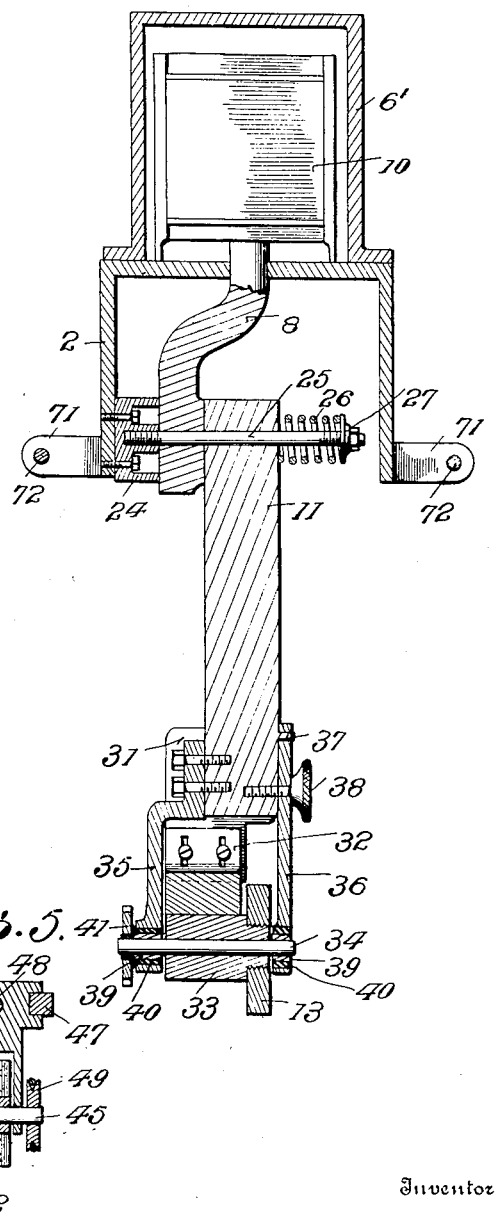

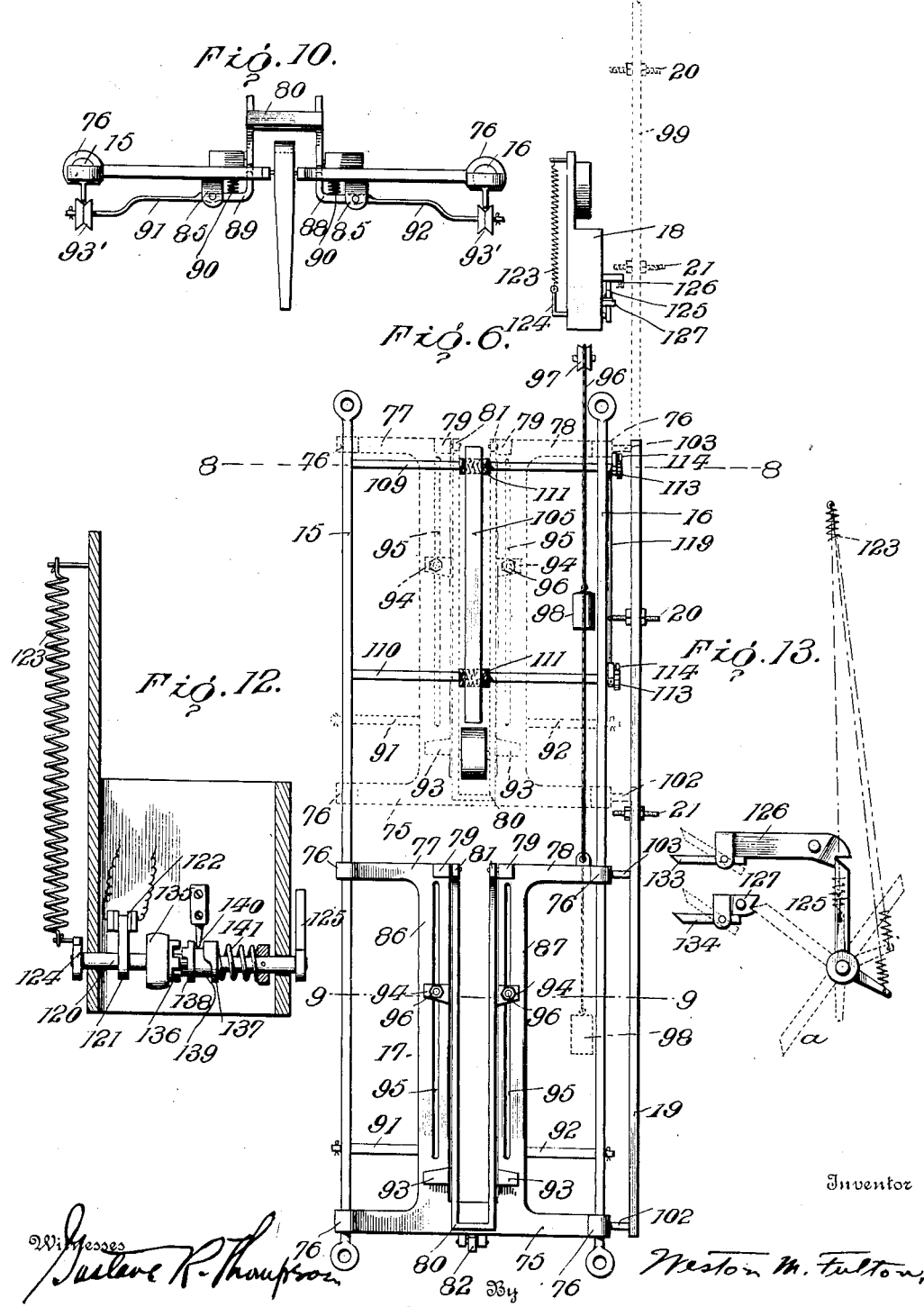

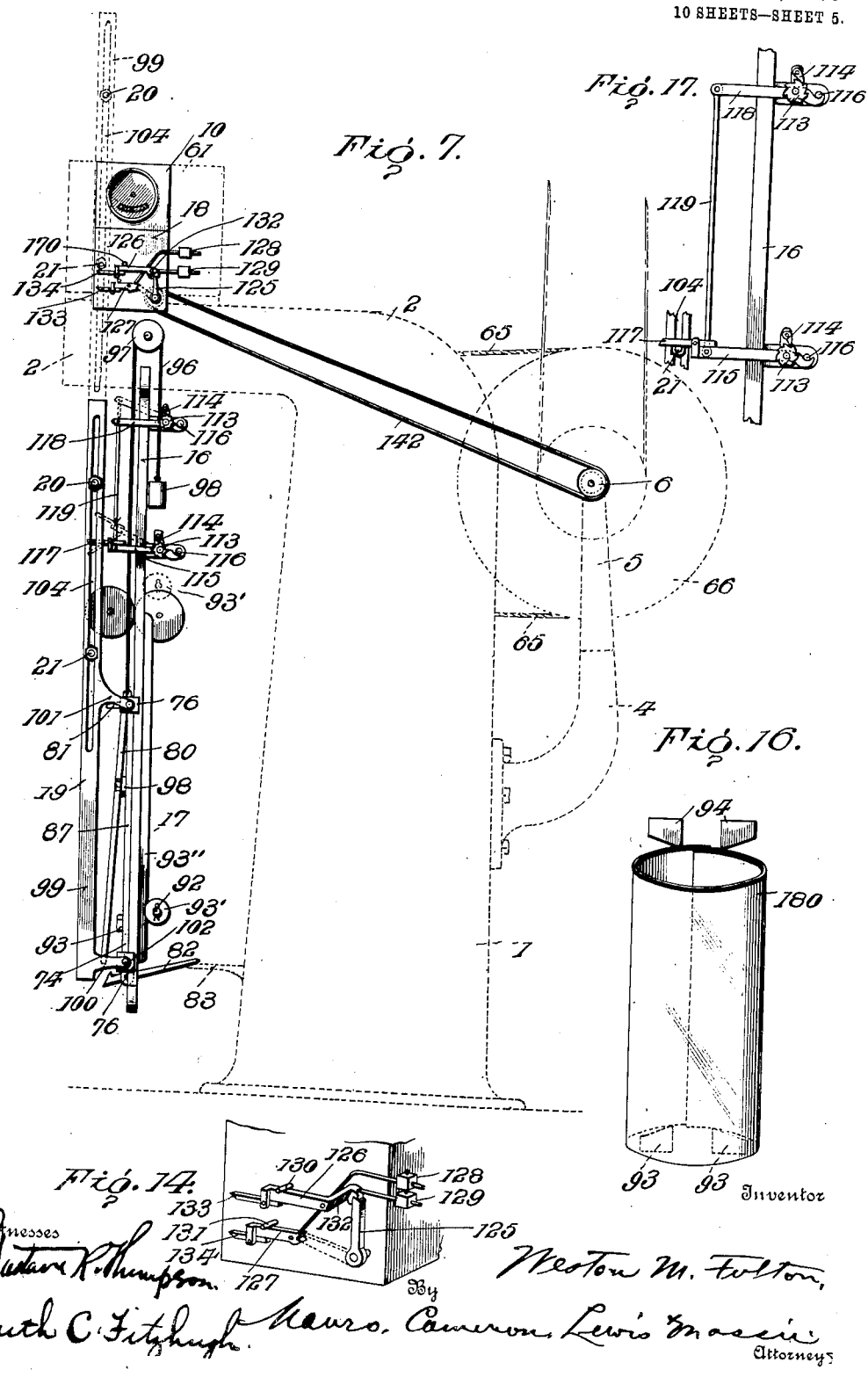

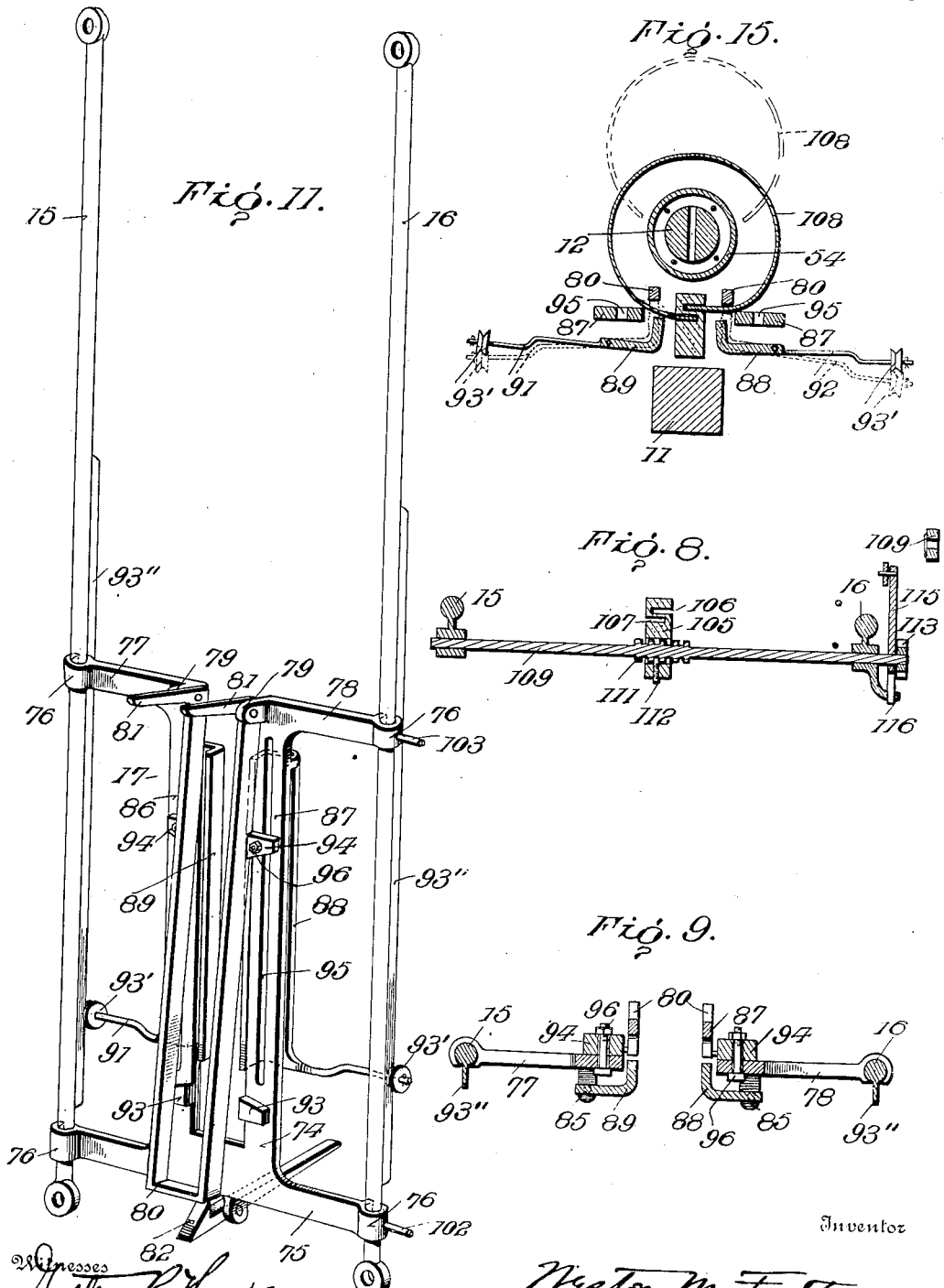

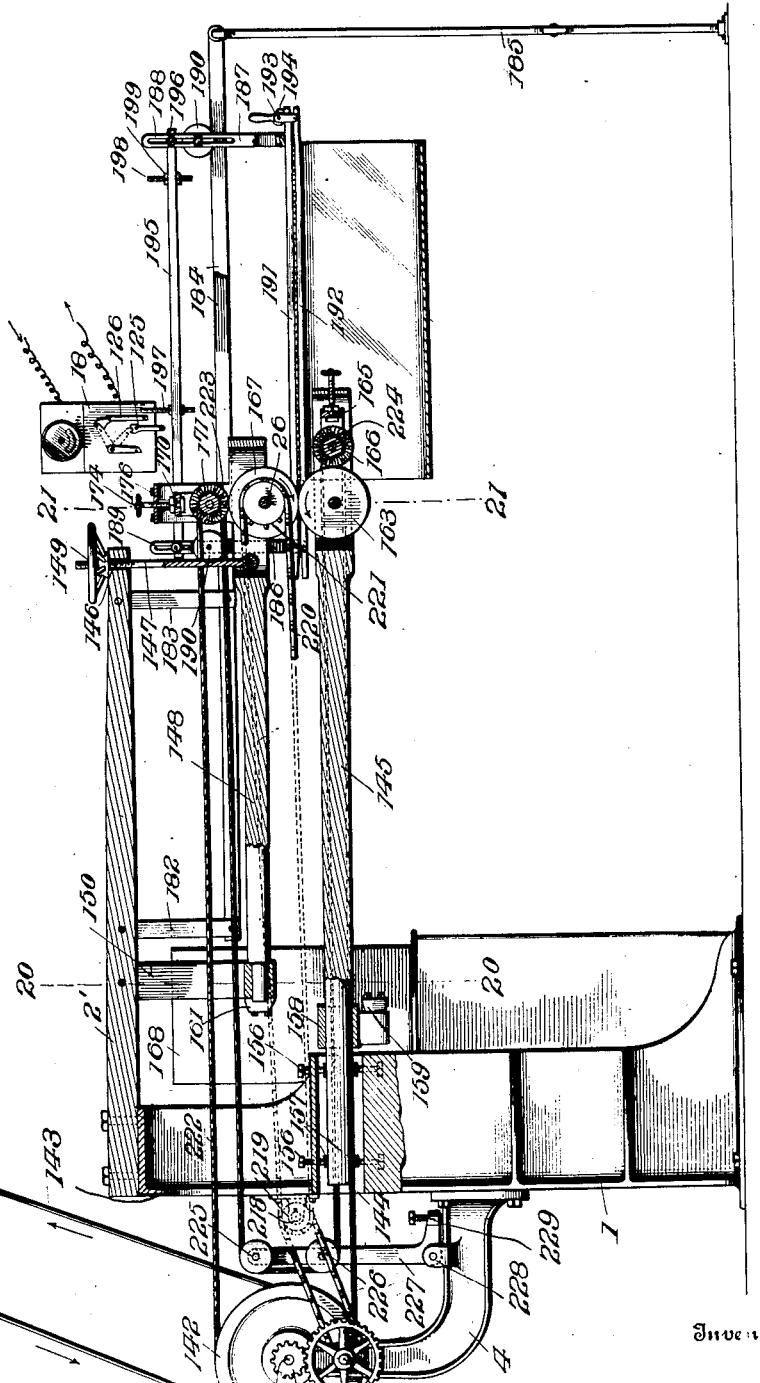

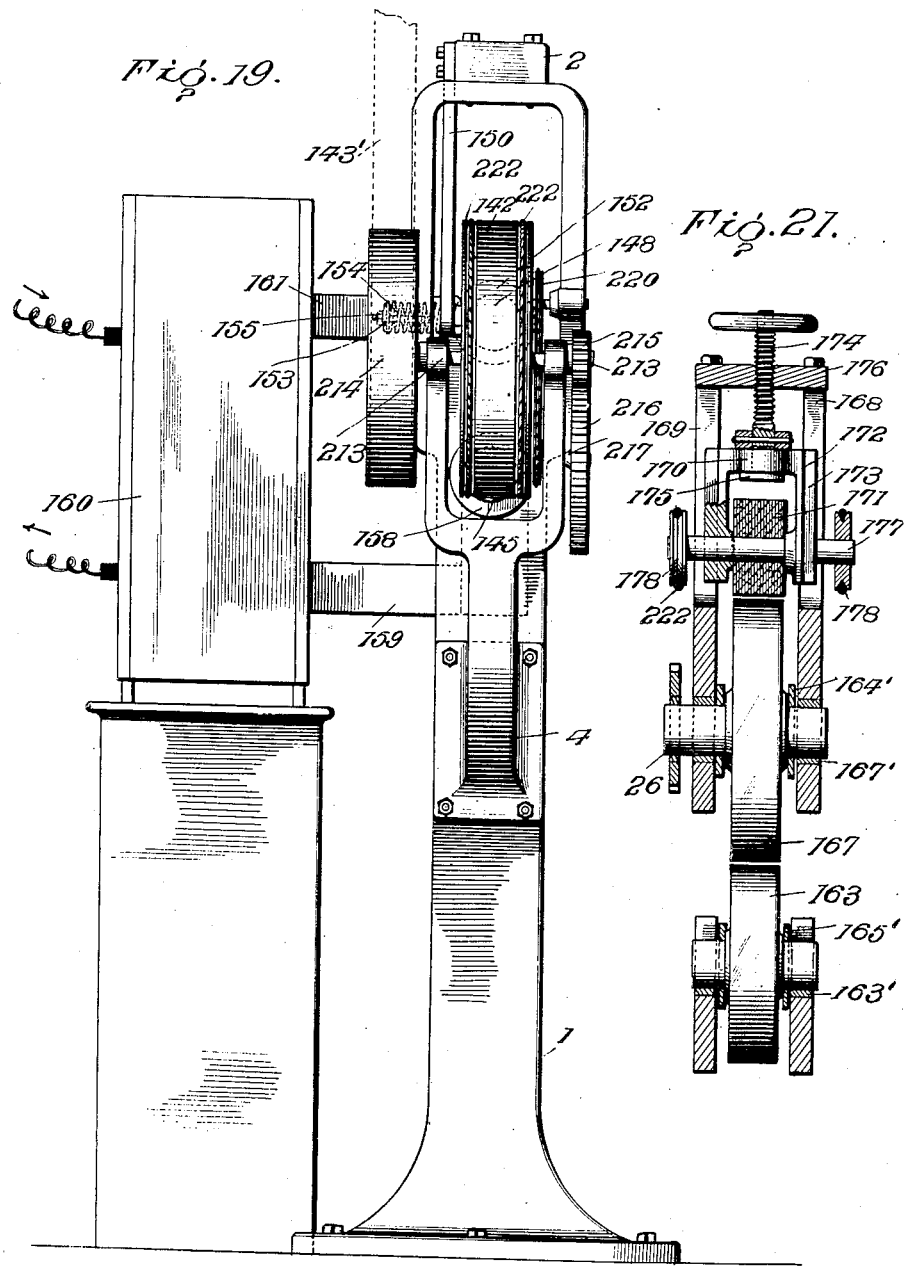

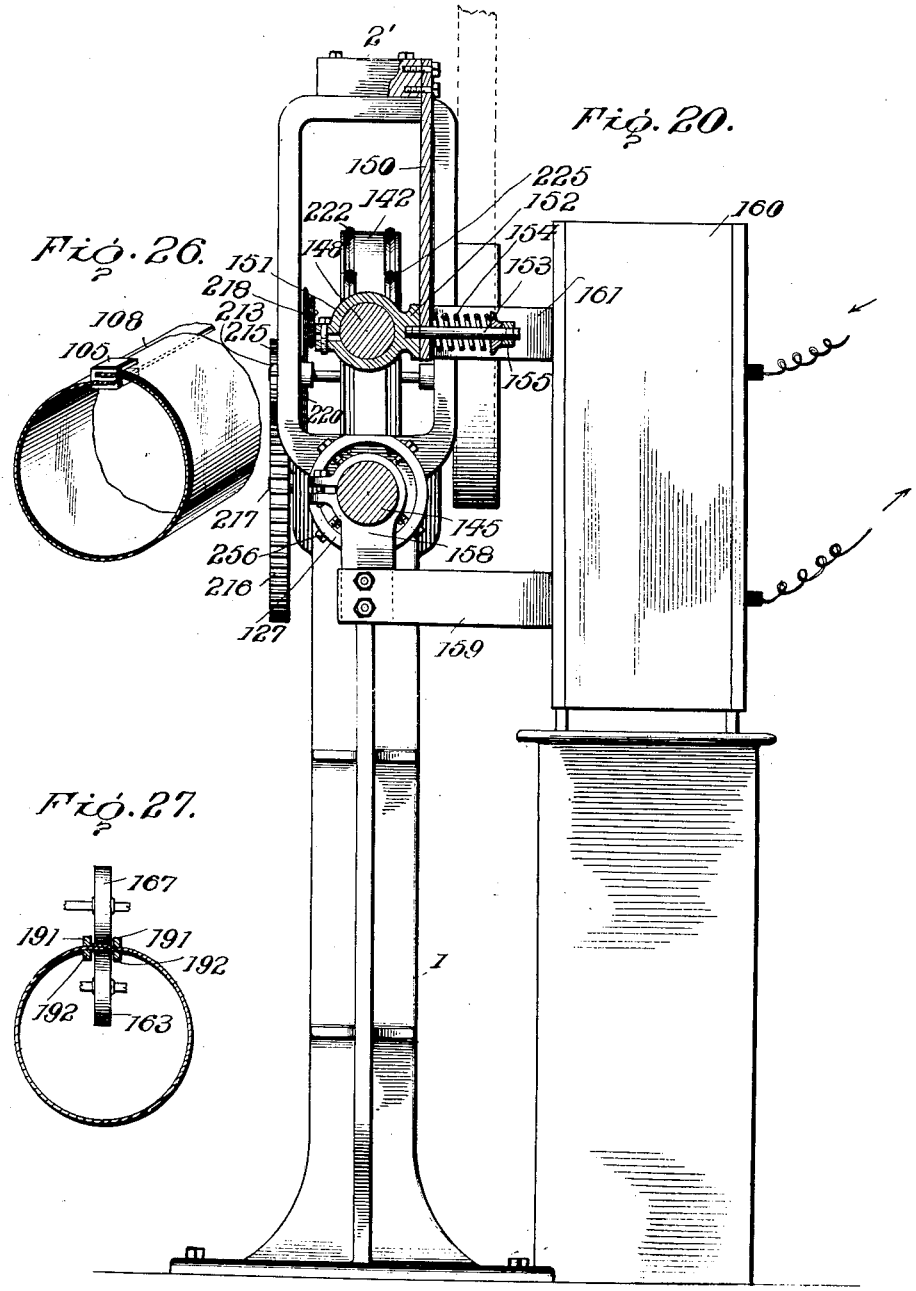

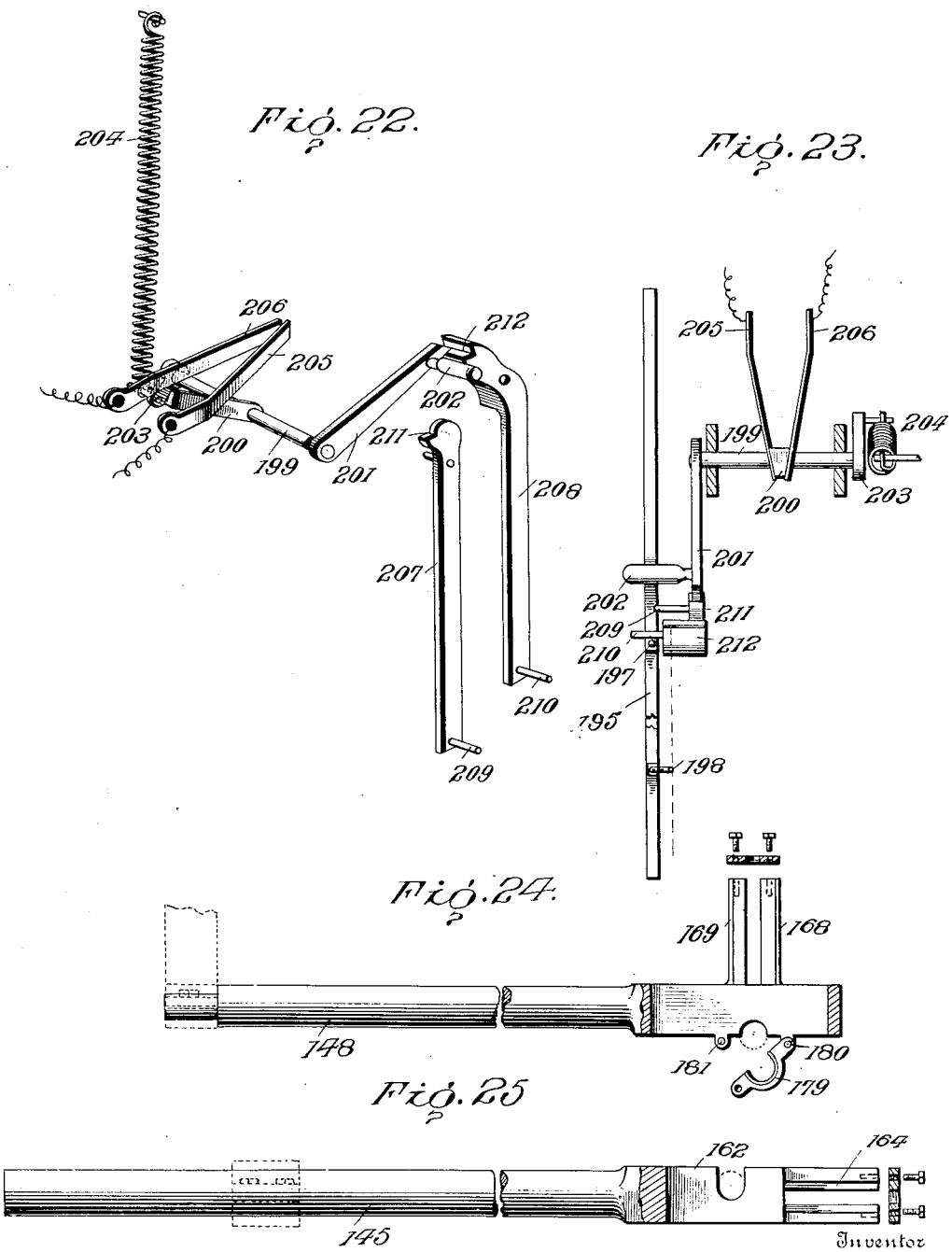

WESTON M. FULTON, OF KNOXVILLE, TENNESSEE, ASSIGNOR TO THE FULTON COMPANY, OF KNOXVILLE, TENNESSEE, A CORPORATION OF MAINE.

ELECTRIC WELDING-MACHINE.

No. 904,771.     Specification of Letters Patent.     Patented Nov. 24, 1908.

Application filed February 7, 1906. Serial No. 299,967.

*To all whom it may concern:*

Be it known that I, WESTON M. FULTON, of Knoxville, Tennessee, have invented a new and useful Electric Welding-Machine, which invention is fully set forth in the following specification.

The present invention relates to electric welding machines, and particularly to machines for electrically welding the edges of sheet metal to make cylindrical or tubular bodies and which employ revoluble electrodes between which the seam is welded.

In electrically welding the seams of cylindrical or tubular sheet metal bodies, the overlapping edges of the sheet metal have been subjected to the unyielding pressure of revoluble electrodes. As a result of this practice the finished seam is often imperfect. The expansion of the metal as it is heated between the electrodes and the unavoidable irregularities in thickness along the seam often causes a binding of the work between the electrodes resulting in a rough and unfinished appearance to the seam. Furthermore, the electrodes soon become defective and out of true, necessitating frequent replacing.

In making articles of the character referred to, there is a tendency for the overlapped edges ahead of the electrodes to spread apart as the welding proceeds. This is due to the successive development of heat and resulting expansion of the metal along the seam. In consequence of this the resulting tubular body becomes distorted and the seam is varied in width. In order therefore to turn out a large number of such bodies of uniform size it is necessary to maintain a uniform width of seam and diameter of body. Uniformity of width of seam is also essential for the economical use of the current, for the reason that the amount of current varies with the width of the seam. A current that affords heat sufficient for welding a seam of one width may not heat the metal of the seam to a welding temperature when the seam is wider. Again it is essential to the economy of material that the lapped edges of the body be subjected to the action of the electrodes conveying the current for the whole length of the seam. If this is not done the ends of the seams require trimming. It is found to be impracticable to pass the current through the electrodes when idle because of waste of current and also of the arcing as the work enters and leaves the electrodes thereby damaging both the work and electrodes.

In electric welding machines employing revoluble electrodes it often happens that irregularities are produced on their peripheries by accidental variations of resistance at the seam causing irregular heating and damage to the electrodes which necessitates trimming and grinding the latter. It is important therefore that they may be easily and quickly removed from the machine with as little loss of time as possible. Surface oxidation of the electrodes is a further difficulty in the way of uniform heating of the seam. Such oxidation takes place especially at the periphery of the electrode when it contacts with the work increasing the resistance at the point of heating, and it also occurs at the bearings of the revoluble electrodes interfering with the use of lubricants because of electrolysis. This is especially the case where copper bears against copper, the excessive corrosion soon clogging and stopping the machine.

The objects of the present invention are to overcome the objections above noted and to provide yielding pressure means for one or both of the revoluble electrodes which shall enable the electrodes to follow irregularities in the work; to afford clamping means for retaining the overlapping edges of the sheet metal in a fixed relation to each other during the entire operation of welding thereby preventing spreading of the seam, warping of the body and irregular heating; to provide a traveling work supporting carriage having means associated therewith for turning on and off the electric current at the moment when the work enters and leaves the revoluble electrodes to effect the welding from end to end of the seam; to provide abrading means for the renewal of the surfaces of the electrodes while in the act of welding; to provide improved bearings for the electrodes and means for the ready and quick removal of the electrodes when it becomes necessary to remove the same.

With these objects in view my invention consists in a sheet metal electric welding machine having a pair of revoluble electrodes yieldingly supported in reference one to the other, revoluble electrode abrading or cleaning devices, a work clamping and gaging device and reciprocating carriage for the same, automatic switch mechanism actuated by the carriage to turn on and off the current at the moment when the electrodes contact and leave the work and in one form of the device means for automatically shifting the seam relatively to the surfaces of the electrodes.

It further embraces other features of invention and combinations of parts fully hereinafter set forth, reference being had to the accompanying drawings by way of illustration.

Figure 1 is a view showing the electric welding machine in side elevation. Fig. 2 is a front elevational view of the same. Fig. 3 is a transverse vertical section taken on the line 3—3 of Fig. 1. Fig. 4 is a transverse vertical section taken on the line 4—4 of Fig. 1. Fig. 5 is a transverse vertical section on the line 5—5 of Fig. 1 showing one of the brushes and its support. Fig. 6 is a front elevation of the carriage and lap gage with other parts removed for clearness. Fig. 7 is a side elevation of the carriage. Fig. 8 is a transverse section on the line 8—8 of Fig. 6.
Fig. 9 is a transverse section through the body of the carriage on line 9—9 of Fig. 6. Fig. 10 is a plan view of the lower end of the carriage shown in Fig. 6. Fig. 11 is a perspective view of the carriage. Figs. 12, 13 and 14 are detailed views of the automatic circuit controller. Fig. 15 is a detail view illustrating the manner of placing a piece of work in the carriage. Figs. 16 and 17 are details. Fig. 18 is a longitudinal vertical central section of a modified construction. Fig. 19 is a rear end elevation of the same. Fig. 20 is a view in part elevation and part section on line 20—20 Fig. 19. Fig. 21 is a transverse vertical section through the machine taken on line 21—21 of Fig. 18. Figs. 22 and 23 are details of the automatic electric switch. Figs. 24, 25, 26, 27 and 28 are details.

Referring to Figs. 1 to 17, a general outline of the machine will first be given. The working parts of the electric welding machine are supported on an upright base 1, surmounted by an arm 2 secured thereto by bolts 3. In the upper part of base 1 is an opening through which the power transmitting cables may pass. Extending to the rear of the machine is a bracket 4, fast to the base 1, and provided at its upper extremity with two vertical arms 5, only one of which appears in Fig. 1, the purpose of which is to support a power shaft 6 for driving the moving parts of the machine. Mounted near the extremity of bracket arm 2 and on the top thereof is a casing 6', within which is mounted electric terminals 8, 9, preferably associated with a transformer 10, Figs. 3, 4, Extending from and supported by said terminals are conductors 11, 12, one of which is shown as square and the other round in section though we may employ other forms in cross section. At the ends of the same are mounted revoluble electrodes 13, 14, between which the seam to be welded passes. Conductor 11 is provided with a pivoted connection with terminal 8 whereby it may be swung to or from its companion 12, which is rigidly supported from terminal 9. Depending from the sides of arm 2 and parallel with conductors 11, 12, are adjustable ways 15, 16, Figs. 1, 6 and 11, on which runs a work-holding carriage 17 which advances the work past the electrodes during the operation of welding. For the purpose of making and breaking the electric circuit feeding the revoluble electrodes at predetermined intervals, there is associated in the said circuit an automatically operated switch 18, actuated by movements of the workholding carriage 17, by means of a rod 19 attached thereto, and provided with adjustable studs or tappets 20, 21, engaging trip levers on switch 18. Associated with the electrodes 13, 14 are brushes 22, 23 which together with the electrodes are driven from the power shaft 6 by means of belts or sprocket chains.

Referring to Figs. 1, 3, 4 and 5, for a detailed description, terminal 8 of the transformer 10, passes downward through the top wall of arm 2, and is bent to approach the side wall of the same from which it is, however, insulated by means of a block 24 of insulating material such as wood fiber. This block 24, is made fast to the bracket wall by bolts sunk into the block and receives a rod 25, which passes through terminal 8, and the end of conductor 11, which latter is yieldingly pressed against terminal 8 by means of a spring 26 held fast by a nut 27, on the end of rod 25. This construction permits conductor 11 to swing on its support 25, and at the same time make an effective metallic connection with terminal 8. For the purpose of swinging electrode 13 into and out of operative relation with its companion electrode 14 and imparting thereto a yielding pressure in the direction of the latter, a spring arm 28 fast at one end to conductor 11, is provided, and has its opposite extremity connected by a link 29, working on an eccentric pivot operated by a handle 30, which in its lowered position forces the electrode 13 forward and retains it in yielding contact with the work. The lower extremity of conductor 11, Fig. 28, is provided with a rear projection constituting a bracket arm 31 to the front face of which is secured an adjustable commutator brush 32 which extends forward to rest on the metallic hub 33, of the copper electrode 13, said hub being fast to a shaft 34, preferably of steel, which is supported in brackets 35, 36, attached to the end shoulder of conductor 11. One of the brackets 35, is bolted to its support whereas bracket 36 is readily removable therefrom, and for this purpose is provided with a socket taking over a lug 37 and is clamped in place by means of a thumb screw 38. Shaft 34 runs in bronze or similar metal bushings separated from the metal brackets 34, 35, by insulating rings 40, such as wood fiber, thereby directing the electric current to the hub 33 and thence to the electrode 13, thus enabling the shaft 39 to be kept lubricated as otherwise the current passing through the bearings expels the lubricant, and the journal boxes soon become injured by electrolysis. The electrode 13 is preferably secured on hub 33 by means of a screw threaded projection although it may be made integral therewith. One end of the shaft 34 is provided with a sprocket wheel 41 insulated from the same in the manner shown in Fig. 3 and receives power from the main shaft 6 by means of an endless sprocket chain connection 42 which is kept taut by a tension device 43, of any improved construction. Wire brush 22, has a hub of insulating material 44, on a spindle 45, carried by two depending arms on a cross head 46, running on ways 47, secured to bracket 31. A screw 48 engages cross head 46 for the purpose of adjusting the brush. Pulleys 49, on brush spindle 45, are provided for the purpose of rotating the brush 22 in contact with its electrode 13.

The construction of electrode 12 is clearly shown in Fig. 4. Terminal 9, which in case a transformer were used, would be a secondary terminal, extends through the top wall of bracket arm 2 and is prolonged into conductor 12, which is bifurcated its entire length, the two members of which are cut away near their lower ends to receive a revoluble electrode 14. This electrode is mounted on a centrally threaded spindle 51, having a reduced unthreaded end 52 and an opposite plain enlarged end, provided with an end groove, the purpose of which is to enable a ready removal of the electrode from its bearings in the insulating casing 54. Intermediate the revoluble electrode 14, which is preferably of copper, and the conductor members 12 of like metal are located bushings 53 of a different metal, such as silver, which has an electric conductivity substantially like that of copper. These bushings are lightly pressed against electrode 14 by means of a clamp screw 55. Casing 54, surrounding conductor 12, is screw-threaded at its upper end and is received by a hanger 56, made fast to the side walls of bracket arm 2 by means of bolts 57. Extending upward from the hanger 56 are arms 58 for supporting idle pulleys 59 and 60. At the lower end of tube 54 is a threaded closure 61, through which works a screw 62 in loose engagement with a yoke 63, supporting a revoluble brush 23 and pulleys 64, of similar construction and mode of operation to that described in connection with electrode 13, and therefore further detailed description of the same is deemed unnecessary. Brush 23 is driven from shaft 6 by means of a pair of belts 65, only one of which appears in Fig. 1, passing over large pulley 66, and thence over pulleys 59, 64, 60, 67, 68, 49, and back to large pulley 66. A tension device 69, shown in dotted lines back of the base support Fig. 1, is employed to maintain the belts taut and may be of any approved form. On opposite side walls of bracket arm 2 and below the casing 6', are four lugs 70, 71, in each pair of which is mounted a screw-threaded member 72. Parallel with and extending from the base 1 is a corresponding screw-threaded member 73 on each side of the machine. Engaging said members 72 and 73, are nuts for receiving the ends of rods 15 and 16, constituting adjustable ways for carriage 17.

Referring to Fig. 11, the carriage 17 consists of a central U-shaped body 74, the base of the said body having arms 75, extending at right-angles thereto and ending in slotted heads 76, taking over rods or ways 15, 16. Arms 77, 78, parallel to arms 75, extend from the ends of the prongs of the U-shaped body 74, and in like manner are provided with slotted heads engaging ways 15, 16. Pivotally mounted at the inner ends of arms 77, 78 in lugs 79, are the ends of a rectangular clamping frame 80 having tappet arms 81. A gravity latch 82, mounted at the bottom of the carriage is provided for engaging the end of clamp frame 80 when the carriage is in operative position and is released from such engagement by a projection 83 on the base 1 Figs. 1 and 7. Pivoted to lugs 85, 85, Figs. 9, 10, on the back of the carriage members 86, 87, are L-shaped clamp bars 88, 89, normally retracted by springs 90. At the lower extremities of bars 88, 89 extend arms 91, 92, carrying at their ends grooved rollers 93', for engaging fins 93'', on the rear of and extending a portion of the length of ways or tracks 15, 16, to advance the clamping ends of bars 88, 89, against the pressure of springs 90. On the face of members 86, 87, are two pairs of guide blocks 93, 94, the two lower blocks 93 being fast to said members, while the upper pair of blocks 94, are adjustable in slots 95, and provided with clamping bolts 96', to adjust the guide blocks to different lengths of work.

Referring to Figs. 6 and 7, attached to the carriage 17, is a cable 96, passing over a pulley 97, and supporting a counterpoise weight 98, whereby the carriage may be normally raised when released. At the right of the carriage and somewhat to the front is a slotted bar 19, having arms 100, 101, supported on lugs 102, 103, projecting from the carriage frame. Mounted in slot 104 of said bar are adjustable tappets 20, 21, for actuating the mechanism for shifting the gage 105 and the automatic switch 18. The automatic gage shifting device is mounted near the upper end of the carriage ways and has the following construction: Gage 105, shown in cross section Fig. 8, is provided with two oppositely disposed slots, 106, 107, for receiving the opposite edges of a sheet metal blank 108, Fig. 15, and is mounted on a pair of operating shafts 109, 110, each having at its center a right and left hand screw-threaded portion 111, which loosely passes through openings near the ends of gage bar 105, and engage pins 112, carried by said bar. The ends of shaft 109, 110 have bearings in the ways 15, 16, and on the right of said ways have extensions on each of which is mounted a pawl and ratchet device of similar construction, only one of which therefore will be specifically described. 113 is a ratchet wheel fast to shaft 110, engaged by a pawl 114, mounted on an extension of lever 115, the short arm of which terminates under a stop pin 116. At the end of its longer arm is a gravity pawl 117 normally resting in a horizontal position. Lever arm 115 of the lower ratchet device is connected to a similar arm 118 of the upper ratchet by means of a link 119, and therefore the two devices operate simultaneously. On the upward movement of bar 19 attached to carriage 17, one of the tappets for example the lower one 21, engages pawl 117, lifts lever arms 115, 118, and rotates ratchet wheels 113 by means of pawls 114, thereby rotating shafts 109 and 110, and advancing gage 105 along the thread 111. By continued rotation of the shafts, the pin 112 will reach the end of one thread and enter the beginning of a reverse thread, thereby reversing the movement of gage 105.

In Figs. 12, 13 and 14, are shown details of the electric switch mechanism which is actuated by engagement of tappets 20, 21 on bar 19, Fig. 6. Mounted in a casing on a shaft 120, is a switch arm 121, in the path of a pair of contacts 122, in the working circuit. A spring 123, one end of which is fast to the casing and the opposite end attached to a crank arm 124 on shaft 120, normally tends to hold switch arm 121 out of engagement with its contacts 122. At the opposite end of shaft 120 and fast thereto, is an arm 125, the end of which is in the same plane with the ends of two trip levers 126, 127, pivotally mounted on the face of casing 18, and provided with weights 128, 129, for normally holding them in a horizontal position against stop pins 130, 131, Fig. 14. Lever 126 is in a plane farther from the face of the casing than lever 127, and is provided with an arm 132 extending back and having its end terminating in the plane of trip lever 127, and in the path of lever 125. Each of the said trip levers 126, 127, is provided with a gravity pawl 133, 134, normally maintained in a horizontal position by gravity. For the purpose of automatically setting the switch after breaking the circuit, there is mounted on shaft 120 a spring pressed clutch consisting of a loose pulley 135, having on its face a clutch member 136. Splined to said shaft is a sleeve 137, movable lengthwise of the shaft, and having a clutch member 138, and a cam groove 139, engaging a stationary cam member 140. Spring 141 normally forces sleeve 137 to the left for engagement of the two clutch members but is restrained from so doing when cam member 140 is in the narrow part of cam groove 139. Pulley 135 takes power from shaft 6 by belt 142 Fig. 1, and continuously rotates during the operation of the machine.

In Fig. 13, arm 125 is restrained from movement by spring 123, by reason of its engagement with the end of trip lever 126. Clutch members 136, 138 are out of engagement and switch arm 121 is ready to move into operation between contact members 122. Assume trip rods 20, 21 on rod 19 are in dotted line position at the upward terminus, Fig. 6, having passed gravity pawls 133, 134. A downward movement of the carriage causes stud 21 to engage gravity pawl 133, depress trip lever arm 126 and releases arm 125, which is thrown to the left by spring 123, but is stopped by meeting the end of trip lever 127 in position to hold switch arm 121 between contacts 122 and close the circuit. Trip rod 21, being too short to extend to gravity pawl 134, passes the same in its downward movement. Trip rod 20 in its downward movement merely swings trip arm 126 out of its path and engages gravity catch 134, depresses the same and in like manner releases arm 125 which moves into dotted line position a Fig. 13, breaking the circuit. At this moment, the wide portion of cam groove 139 is opposite cam member 140, permitting spring 141 to close the clutch and permit pulley 135 to rotate shaft 120 and arm 125 into position when the latter comes under operation of spring and is snapped into its first position in engagement with the end of arm 126. In the meantime, the narrow part of cam groove 139 engages member 140 and opens the clutch.

The operation of the machine as thus far described is as follows: The machine having been assembled and the several parts adjusted to the character of work to be welded, shaft 6 is coupled to a source of power and brushes 22, 23, electrode 13, and pulley 135 of the resetting device, are set in rotation through their belt connections to said shaft. After starting the machine, it is not necessary to discontinue its operation for each piece to be welded, but preferably should be run continuously while in use. Handle 30 is next depressed to bring electrode 13 into yielding contact with its companion to which it imparts rotation and retained in such contact while the machine is running. Carriage 17 is normally held in its uppermost or dotted line position by counterpoise weight 98, Fig. 6, the electrodes 13, 14 being in position between the prongs 86, 87 of the carriage near its lower end while gage 105 is above and in line with the electrodes. While the carriage is in its elevated position, arms 81, 81 on the upper ends of clamp frame 80, engage pins 141', on casing 54 thereby forcing said clamp frame into closed position on the face of the carriage, in which position it is locked by gravity latch 82. The rear clamping jaws 88, 89, are held open by springs 90 Fig. 10, the rollers 93', on the ends of arms 91, 92, being out of engagement with track fins 93''. The blank to be welded is bent into a semi-circular form by hand, as in dotted line form Fig. 15, then is passed around casing 54, and its edges slipped under the arms of frame 80, and into the oppositely disposed grooves in gage 105, being guided thereto by the end guide blocks 93, 94. These guides particularly insure the even adjustment of the ends of the blank as it enters the gage. The operator while holding the work into position described, bears downward and thus forces the carriage to move down till rolls 93' ride onto fins 93'' thereby forcing jaws 88, 89, forward and clamping the work between the members of the clamp frame 80 and the said jaws. A further downward movement of the carriage brings the lapped edges of the tube between the electrodes. At this moment, tappet rod or stud 21 engages gravity pawl 134, Fig. 7, thereby releasing arm 125 and closing the circuit as above described. The work is now drawn downward by the rotating electrodes and with it the carriage. As soon as the work passes the electrodes, the operator who has in the meantime been holding the work and gently aiding the electrodes, now draws the work downward more vigorously until the end of gravity latch 82 meets projection 83 and releases clamp frame 80. The work is now withdrawn. At the time when the electrodes passed off the seam, stud 20 on rod 19, engaged gravity pawl 134, thereby releasing arm 125 and breaking the circuit. On removal of the work from the carriage, the latter moves upward by action of weight 98 and in doing so, stud 21 engages gravity pawl 117, lifts lever 115, 118, thereby operating the ratchets, imparting a partial rotation to shafts 109 and 110, and shifting the gage 105, thereby directing the next seam to a different part on the surface of the electrodes which are preferably wider than the seam to be welded. The machine is now ready to repeat the operation.

Figs. 18 to 27 illustrate the invention wherein the general construction is similar to that above described, but differs in specific details. 1 is a cast-iron standard having at one side a bracket 4 carrying at its upper extremity driving mechanism. In the upper part of standard 1 are two openings 143, 144, through which the driving-belts pass, and in the lower one of which passages is supported a conductor 145. On the top of this base is an arm 2' bolted thereto and preferably of non-conducting material, such as wood. At the extremity of arm 2' is an opening 146, through which passes a screw-threaded rod 147 secured at its lower extremity to an upper conductor 148. At the upper end of this rod is a handle 149 by means of which the electrode may be raised and lowered. The opposite end of conductor 148 is supported by a metal arm 150, which is bolted at its upper extremity to arm 2'. Taking over the conductor 148 is a screw-clamp 151 having a hub 152 into which enters a rod 153 passing through metal arm 150. A helical spring 154 having its outer end held by a bolt and washer 155 securely holds clamp 151 in contact with member 150, thereby making an efficient metallic contact with said member and at the same time permitting clamp 151 to oscillate in its support. Conductor 145, which enters opening 144, is secured therein by means of bolts 156 having on their inner extremities insulating pieces 157. Secured to conductor 145 is a clamp 158 which connects with the conductor 159 to one terminal of a transformer 160, the other terminal of the transformer being connected to the conductor 148 by means of a metal strip 161.

Referring to Figs. 24 and 25, one end of conductor 145 is provided with prongs 162 forming a rectangular opening for the reception of lower electrode 163. At right angles to this opening is a slot 164 for the reception of a cross-head 165, Fig. 18, on which is mounted a brush 166. On the upper side of arms 162 are depressions forming bearings for the said electrode 163. On the extremity of conductor 148 is a similar rectangular opening for the reception of electrode 167, and extending upward from the end of this electrode are supports 168 and 169 for receiving a cross-head 170 carrying a brush 171. Cross-head 170 consists of a U-shaped member having on the sides or the prongs 172 flanges 173, which take into the vertical slot formed by uprights 168, 169. Passing through the head of the yoke is a screw-threaded rod 174 having a head 175. Rod 174 passes through a top-piece 176 secured to uprights 168 and 169, and has on its upper end a handle for rotating the same. In the lower extremities of the prongs 172 is supported a shaft or spindle 177, on which is fast a brush 171 to which rotation is imparted by means of pulleys 178. Cross head 165 is of similar construction to that just described, and also carries a brush 166 for the purpose of cleaning electrode 163. Electrode 167 is suspended from the end of conductor 148 by means of a hanger 179, one end of which is pivotally supported in lug 180 and the other end secured to lug 181 by means of a suitable pin, thereby enabling the electrode to be readily removed. Electrode 163 simply rests upon its bearings on the top of prongs 162 of conductor 145. The journals of electrodes 163 and 167, which are preferably of copper, rotate in bushings 163′ and 167′ of a different metal, such as silver, the faces of the electrodes being separated from their supports by silver washers 164′ and 165′, thereby preventing galling and clogging of the journals in their bearings, which would result if they were allowed to come into contact with copper surfaces. Depending from arm 2′ are supports 182, 183, to the lower ends of which are attached rails or ways 184, the outer ends of which rest upon standard 185, only one of these rails being shown in Fig. 18. Running on rails 184 is a carriage-frame consisting of yokes 186 and 187, having slotted arms 188 and 189, in which are adjustably secured rollers 190. Centrally supported on said yoke is a pair of clamp bars 191 separated from each other to receive between them the rim of electrode 167. At one end of said clamp bars is pivotally supported a second pair of bars 192, the ends of said bars being slightly beveled near their support. Secured to the opposite end of the lower clamp bars 192 is a clamping device consisting of a yoke 193 carrying a cam 194 to which is attached a handle by means of which the lower bars may be forced against the upper members 191. Supported on said carriage is a bar 195 secured to the slotted arms 188, 189 by means of adjusting bolts 196. On arm 195 are lugs 197, 198, which may be adjusted along said arm and fixed in any desired position by means of clamp bolts 199. Lug 197, as illustrated in Fig. 18, is slightly longer than lug 198, which latter is bent backward and out of alinement with its companion, as shown in Fig. 23.

For the purpose of automatically breaking the circuit through the electrodes, there is provided a switch device the detailed construction of which is shown in Figs. 22 and 23. Mounted on a spindle 199 is a switch-blade 200. At one extremity of this spindle is a crank-arm 201, having a handle 202. At the opposite extremity of said spindle is a crank handle 203, to which is attached a spring 204, the opposite end of which is made fast to the switch casing. Mounted in line with the switch-blade are two flexible contacts 205, 206. Pivotally supported on the face of the switch-casing are two trip-arms 207, 208, having at their lower extremities crank-pins 209, 210, and at their upper extremities notched ends 211, 212 for the reception of crank-handle 202. Trip-arm 208 is supported in a plane farther removed from the switch-casing than that of trip-arm 207; the upper end of arm 208 however, is bent inward toward the casing and in line with the upper end of arm 207. The crank-pin 210 on the extremity of arm 208 is slightly above that of crank pin 209 on arm 207. To set the switch, crank-handle 202 is swung into position against the tension of spring 204 to rest on the extremity of trip-arm 208 in notch 212. On the forward movement of the carriage, lug 197 on bar 195 engages crank-pin 210, thereby releasing crank-handle 202 and permitting it to move downward under the tension of the spring until it is arrested by meeting the upper end of trip-arm 207. In this position blade 201 will rest between terminals 205, 206, and complete the electrical circuit through the switch and through the electrodes. On a further movement of the carriage lug 198 on arm 195 engages crank-pin 209, thereupon releasing crank-handle 202 and permitting the spring 204 to throw the switch-blade 200 out of contact with contacts 205, 206, thereby breaking the circuit. The driving mechanism supported on arm 4 of the standard 1 consists of a main shaft 213 carrying a double grooved pulley 142. On the outer extremity of said shaft is a pulley 214 connected by a belt 143′ to a driving shaft, not shown. On the opposite extremity of shaft 213 is a pinion 215 meshing with a gear wheel 216, the shaft of which carries a sprocket-wheel 217 over which runs a sprocket-chain connecting with a sprocket-wheel 218. Fast to the shaft carrying sprocket-wheel 218 is a second sprocket-wheel 219 connected by a sprocket-chain 220 to a sprocket-wheel 221 on the shaft of electrode 167, which latter will rotate when power is applied to shaft 213. Passing over double-grooved pulley 142 are belts or cables 222 running over pulleys 223 and 224 on the spindles of brushes 166 and 171 and thence over two idler pulleys 225, 226 carried by a bell-crank lever 227 mounted in lugs 228 on arm 4. At the extremity of the smaller arm of the bell-crank is an adjusting screw 229, whereby the longer arm of the bell-crank 227 may be drawn to the left, and thereby rendering the cables taut.

The operation of this form of the device, as thus far described, is as follows:—A blank sheet of metal is bent into cylindrical form and a small S-shaped piece of steel, shown in Fig. 26, is inserted over the terminal edges of the blank to temporarily secure the pieces together. The clamping bars 192 are lowered by opening of the clamping device referred to and the bent-up metal sheet slipped over the lower bars 192, whereupon said bars are clamped against their companions 191 by means of said clamping device, thereby holding the edges of the blank firmly together, as indicated in Fig. 27. The S-shaped pieces of steel are removed and the blank advanced close to the electrodes. The upper electrode is then lowered into contact with its companion by means of hand-adjusting screw 146 and held in yielding contact therewith. The power shaft is now thrown into engagement to start the rotation of the electrodes and the operation of the brushes. At the moment the blank approaches the electrodes, stud 197 engages crank-pin 210 on tappet-arm 208 and releases arm 201, thereby permitting the spring 204 to throw the switch 200 forward and between contacts 205, 206, thereby closing the circuit. The carriage is then drawn forward by the electrodes, assisted by the operator, welding the seam as the work advances. On reaching the end of the seam lug 198 engages crank-pin 209 on tappet-arm 207 permitting crank-arm 201 to be advanced by spring 204 out of contact with the conducting members 205, 206, thereby breaking the circuit. The carrier now stops moving of its own accord and the driving mechanism is disconnected from the line shafts. The electrodes are separated and the carriage drawn back to its starting position, the work-clamp released and the welded body withdrawn. It is to be understood that in inserting the work in the carriage it is always placed in the same position with respect to the lugs or studs 197, 198, so that having properly adjusted these studs once, they do not have to be changed again while welding bodies of the same length.

In the description of the machine a transformer has been described, giving an alternating current, though a direct current may be used without changing the construction of the device. To facilitate the flow of electric current from the conductors to the electrodes commutator brushes may be fastened on either side of the conductor and made to press against the ends of the journals or rotary electrodes, and be mounted so as to be readily detached or withdrawn for the purpose of removing the electrodes.

What is claimed is:

1. In an electric welding machine, the combination of a plurality of electric conductors, one of which oscillates relatively to the other, revoluble electrodes mounted near the ends of said conductors, revoluble brushes in contact with each electrode, and driving mechanism positively connected to one of said electrodes and to each of said brushes.

2. In an electric welding machine, the combination of a plurality of yieldingly pressed revoluble electrodes for welding lapped seams, lap seam, clamping means for holding the lapped edges of the work together to prevent the same from spreading in front of the welding point, and a work-holding carriage on which said clamping means is mounted.

3. In an electric welding machine, the combination of a plurality of electrodes between which the work to be welded passes, a lap gage device for fixing the width of the overlapping edges of the work, clamping means for holding the said lapped edges fast during the welding operation, and a carriage on which said clamping means is mounted.

4. In an electric welding machine, the combination of a plurality of electrodes between which the work to be welded passes, a lap gage device for fixing the width of the lapped edges of the work, clamping means for holding said edges fast during the welding operation, a carriage on which said clamping means is mounted, and means actuated by the carriage for shifting said gage relatively to the circumferential surfaces of the electrodes.

5. In an electric welding machine, for welding tubular bodies, the combination of a plurality of electrodes between which the work to be welded is passed, a lap gage device for fixing the width of the lapped edges of the work, clamping means for holding said edges fast during the welding operation, a carriage on which said clamping means is mounted, guides on said carriage to engage the ends of the said work and means actuated by said carriage for shifting said gage.

6. In an electric welding machine, the combination of a plurality of electrodes, a work supporting carriage, an electric switch device in circuit with said electrodes and means on said carriage for actuating said switch device to close the circuit as the work enters between the electrodes and to open the switch as the work leaves said electrodes.

7. In an electric welding machine, the combination of a plurality of electrodes, between which the work to be welded passes, a work supporting carriage, an electric switch device in circuit with said electrodes, means on said carriage for actuating said switch device to close said circuit as the work enters between said electrodes and to open the switch as the work leaves said electrodes and automatic switch resetting means.

8. In an electric welding machine, the combination of a plurality of electrodes, a work holding carriage movable into and out of welding position, a work holding clamp member having one end pivoted on said carriage, normally opened spring pressed jaws and means actuated by the movement of the carriage for holding said jaws in clamping position during the welding operation.

9. In an electric welding machine, the combination of a plurality of electrodes, a work holding carriage movable into and out of welding position, ways for said carriage, a work holding clamping member having parallel arms united at one end and having pivotal connections with the carriage at its opposite end, locking means for said clamping member operative at one terminal of the traverse of the carriage, and unlocking means for the same at its opposite terminal, a pair of jaws normally restrained from closing on said clamping member and means actuated by the movement of the carriage for holding said jaws in clamping position during the welding operation.

10. In an electric welding machine for welding tubular bodies, the combination of a plurality of electrodes, a work holding carriage movable into and out of welding position, ways for said carriage, a lap seam gage in the path of said carriage, a work clamping device on said carriage, means actuated by the movement of said carriage for maintaining said device in clamping position during the welding operation and clamp release means actuated at the end of the traverse of said carriage.

11. In an electric welding machine for welding tubular bodies, the combination of a plurality of electrodes, a work holding carriage movable into and out of welding position, ways for said carriage, a lap seam gage in the path of said carriage, means actuated by the carriage for shifting the position of said gage relatively to said electrodes, a work clamping device on said carriage opened and closed by the movements of said carriage and an electric switch in the circuit of said electrodes and means actuated by said carriage for closing said switch when the work enters the electrodes and opening the same when the work leaves the electrodes.

12. In an electric welding machine for welding tubular bodies, the combination of a plurality of electric conductors, revoluble electrodes mounted at the ends of said conductors, an insulating casing inclosing one of said conductors and provided with a side opening through which the revoluble electrode projects.

13. In an electric welding machine for welding tubular bodies, the combination of a plurality of electric conductors, revoluble electrodes mounted at their ends, one of said electrodes having resilient forked arms between which its electrode is mounted, a tension means for said arms and an insulating casing inclosing said conductor and having an opening therein through which the electrode projects.

14. In an electric welding machine, the combination of a revoluble electrode, a metal hub having a screw-threaded portion for receiving said electrode, a commutator brush bearing on said hub and insulating bushings for the bearing of said hub.

15. In an electric welding machine, the combination of an electric conductor, a revoluble electrode having a metal hub, journal bearing brackets supporting said electrode and attached to said conductor, one of said brackets being readily removable, and a commutator brush contacting with said hub.

16. In an electric welding machine, the combination of a bifurcated electric conductor, an inclosing casing for the same, a revoluble electrode having bearings in said casing and metal rings in contact with said electrode and electric conductor.

17. In an electric welding machine, the combination of a plurality of electrodes, a work supporting carriage movable into and out of welding position, stationary switch blades, a shaft subject to longitudinal spring tension having fast thereon a switch arm in the path of switch blades and normally out of contact with the same, a clutch on said shaft normally held open against spring pressure, and carriage operated means for automatically closing and opening said switch and closing said clutch to reset said switch.

18. In an electric welding machine, the combination of a work-holding carriage, revoluble electrodes in the path of said carriage, a plurality of clamping jaws mounted on said carriage for holding the lapped edges of a tubular body in welding position, adjustable end guides for said tubular body, and clamp-releasing means actuated at one end of the traverse of said carriage.

19. In an electric welding machine, the combination of a work-holding carriage, revoluble electrodes in the path of said carriage, a plurality of clamping jaws mounted on said carriage for holding the lapped edges of a tubular body in welding position, and clamp releasing means actuated at one end of the traverse of said carriage.

20. In an electric welding device, the combination of a plurality of revoluble electrodes, traveling clamping means for holding the overlapping edges of the work fast during the welding operation, and a lap gage in the path of said clamping means for fixing the width of the overlapping edges of the work.

21. In an electric welding machine, the combination of a plurality of revoluble electrodes between which the work to be welded is placed, and a plurality of pivotally mounted clamping bars for holding the lapped edges of a tubular blank in parallel relation in the welding position.

22. In an electric welding machine, the combination of an electric terminal, a conductor having a spring-pressed hinge connection therewith, and a revoluble electrode supported by said conductor.

23. In a machine of the character described, two current-conducting members, one of which is revoluble and in frictional contact with the other member, one of said members being of silver and the other of copper to reduce heating effects at the contacting surfaces.

24. In an electric welding machine for welding lapped seams in tubing, the combination of seam clamping means holding the overlapping edges of the seam in welding position, and yieldingly pressed revoluble electrodes in the path of the seam one within the tube and the other exterior to the same.

25. In an electric welding machine, the combination of a work-holding carrier, seam welding electrodes in the path of said carrier, and work-shifting means to bring successive seams to different welding positions on the faces of the electrodes.

26. In an electric welding machine, the combination of a work-holding device and seam welding electrodes, said device and electrodes being movable relatively to each other, and work-shifting means to bring successive seams to different welding positions on the faces of the electrodes.

27. In an electric welding machine for welding tubular bodies, the combination of a plurality of electric conductors, revoluble electrodes mounted at the ends of said conductors, an insulating casing inclosing one of said conductors and provided with an opening for said electrode, and means for removing incrustation from one of said electrodes.

In testimony whereof I have signed this specification in the presence of two subscribing witnesses.

WESTON M. FULTON.

Witnesses:
W. C. HAZEN,
L. F. NICHOLS.